US011043173B1

(12) United States Patent
Zhang

(10) Patent No.: US 11,043,173 B1
(45) Date of Patent: Jun. 22, 2021

(54) MURA PHENOMENON COMPENSATION METHOD AND DEVICE THEREOF

(71) Applicant: SHENZHEN CHINA STAR OPTOELECTRONICS SEMICONDUCTOR DISPLAY TECHNOLOGY CO., LTD., Shenzhen (CN)

(72) Inventor: Hua Zhang, Shenzhen (CN)

( * ) Notice: Subject to any disclaimer, the term of this patent is extended or adjusted under 35 U.S.C. 154(b) by 0 days.

(21) Appl. No.: 16/757,397

(22) PCT Filed: Jan. 5, 2018

(86) PCT No.: PCT/CN2018/071672

§ 371 (c)(1),
(2) Date: Apr. 19, 2020

(87) PCT Pub. No.: WO2019/100553

PCT Pub. Date: May 31, 2019

(30) Foreign Application Priority Data

Nov. 23, 2017 (CN) ........................ 201711202640.0

(51) Int. Cl.
*G09G 3/36* (2006.01)
*G09G 3/3233* (2016.01)
*G09G 3/34* (2006.01)
*G02F 1/133* (2006.01)

(52) U.S. Cl.
CPC ....... *G09G 3/36* (2013.01); *G09G 2320/0233* (2013.01)

(58) Field of Classification Search
CPC ......... G09G 3/36–3648; G09G 3/3233; G09G 3/3426; G02F 1/13306
See application file for complete search history.

(56) References Cited

U.S. PATENT DOCUMENTS

| | | | | |
|---|---|---|---|---|
| 2008/0088649 A1* | 4/2008 | Ikeno | G09G 3/3611 | 345/690 |
| 2017/0061897 A1* | 3/2017 | Zhang | G09G 3/3426 | |
| 2018/0075802 A1* | 3/2018 | Liu | G09G 3/3233 | |
| 2018/0261167 A1* | 9/2018 | Zhang | G02F 1/13306 | |

FOREIGN PATENT DOCUMENTS

| | | | |
|---|---|---|---|
| CN | 105355183 A * | 2/2016 | G09G 3/3648 |
| CN | 105589230 A * | 5/2016 | G09G 3/36 |
| CN | 105590606 A * | 5/2016 | G09G 3/3607 |

* cited by examiner

*Primary Examiner* — Lin Li

(57) ABSTRACT

A Mura phenomenon compensation method and a device thereof are provided. By dividing compensation data of all areas of a display panel into areas for which corresponding timer control integrated circuits are responsible and storing them in different positions in a storage area of a flash memory respectively, each of the timer control integrated circuits only reads its corresponding part of the compensation data during operation, which prevents a problem that a plurality of timer control integrated circuits cannot distinguish effective compensation data matrices corresponding to their responsible areas, causing errors in compensation effect of each timer control integrated circuit.

10 Claims, 4 Drawing Sheets

MURA PHENOMENON COMPENSATION METHOD AND DEVICE THEREOF

CROSS REFERENCE TO RELATED APPLICATIONS

The present application claims priority of the Chinese patent application No. 201711202640.0 filed on Nov. 23, 2017 with the National Intellectual Property Administration, titled "Mura phenomenon compensation method and device thereof", which is incorporated by reference in the present application in its entirety.

FIELD OF INVENTION

The present disclosure relates to the field of display technologies, and more particularly, to a Mura phenomenon compensation method and a device thereof.

BACKGROUND OF INVENTION

In driving circuits of display panels, data processing ability of timer control integrated circuits (TCON IC) has certain limitations. Taking a timer control integrated circuit having a maximum resolution of 3840*2160 and a refresh rate of 120 Hz as an example, if a display panel having a resolution of 7680*4320 and a refresh rate of 60 Hz is required to be driven, then two timer control integrated circuits are necessary to be used in parallel, and each timer control integrated circuit is responsible for a left half display area or a right half display area, or an upper half display area or a lower half display area. When a plurality of timer control integrated circuits are used in parallel to drive the display panel, there are some problems when using a compensation technology for brightness differences of the display panel. A camera takes an image of entire display areas of the display panel and calculates a corresponding grayscale compensation data matrix. When the camera transmits the grayscale compensation data matrix to the parallel timer control integrated circuits at a same time, because one timer control integrated circuit is only responsible for data in one of the display areas of the display panel, the timer control integrated circuits cannot distinguish effective compensation data matrices corresponding to their responsible areas, causing errors in compensation effect of each timer control integrated circuit.

SUMMARY OF INVENTION

A main subjective of the present disclosure is to provide a Mura phenomenon compensation method and a device thereof to make a brightness compensation function of a display panel can reach an accurate compensation effect when a plurality of timer control integrated circuits work in parallel.

To achieve the above objective, an embodiment of the present disclosure provides a Mura phenomenon compensation method which is used in a plurality of parallel timer control integrated circuits processing a display panel. The method comprises following steps: step one: taking an image of entire display areas of the display panel; step two: calculating a compensation data matrix a of the entire display areas of the display panel; step three: setting a number of the timer control integrated circuits as N and dividing the display panel into N small parts, wherein each timer control integrated circuit controls each small part; step four: setting resolution of the display panel as B1*B2 and setting reference points in the compensation data matrix a as A1*A2 at equal intervals, wherein the compensation data matrix a is equal to (B1/A1+1)*(B2/A2+1); when the reference points corresponding to the N small parts are integers, the compensation data matrix a is divided into N small matrices C, and each of the small matrices C is equal to (B1/A1+1)*((B2/A2)/N+1); and when the reference points corresponding to the N small parts are not integers, the compensation data matrix a is divided into the N small matrices C, and each of the small matrices C is equal to (B1/A1+1)*((B2/A2+1)/N+1); step five: inputting each of the small matrices into each of the corresponding timer control integrated circuits; and step six: each of the timer control integrated circuits only reads compensation data of its corresponding small matrix.

Alternatively, each of the timer control integrated circuits is correspondingly connected to one flash memory, and each of the small matrices C is input into each flash memory respectively.

Alternatively, the N timer control integrated circuits are together connected to one flash memory, the flash memory is divided into N storage areas, and each of the small matrices C is input into each of the storage areas respectively.

Alternatively, when N is 2, the resolution of the display panel is set to be 7680*4320, and the reference points set at intervals are 16*16, the compensation data matrix a is 481*271, the reference points corresponding to both of the small parts are integers, and each of the small matrices C is 481*136.

Alternatively, when dividing the compensation data matrix a of 481*271 into an upper small matrix and a lower small matrix, the compensation data in a 136th row of the compensation data matrix a is copied.

Alternatively, when N is 2, the resolution of the display panel is set to be 7680*4320, and the reference points set at intervals are 32*32, the compensation data matrix a is 241*136, the reference points corresponding to the display areas of both of the small parts are not integers, and each of the small matrices C is 241*69.

Alternatively, when dividing the compensation data matrix a of 241*136 into an upper small matrix and a lower small matrix, the compensation data in a 68th row and a 69th row of the compensation data matrix a is copied.

The present disclosure further provides a Mura phenomenon compensation device. The device comprises: a display panel divided into a plurality of display areas; a plurality of timer control integrated circuits, wherein each of the timer control integrated circuits is correspondingly connected to each of the display areas; and a Mura phenomenon compensation processing chip configured to be connected to the timer control integrated circuits, used to calculate a compensation data matrix a of the entire display areas of the display panel, and to divide the compensation data matrix a into a plurality of small matrices, wherein data of each small matrix correspondingly compensates each of the display areas.

Alternatively, each of the timer control integrated circuits is correspondingly connected to one flash memory, and the data of each small matrix is input into each flash memory respectively.

Alternatively, the timer control integrated circuits are together connected to one flash memory, the flash memory is divided into N storage areas, and the data of each small matrix is input into each of the storage areas respectively.

The Mura phenomenon compensation method and the device thereof provided by the present disclosure, through dividing compensation data of all areas of a display panel into areas for which corresponding timer control integrated circuits are responsible and storing them in different positions in a storage area of a flash memory respectively, each of the timer control integrated circuit only reads its corresponding part of the compensation data during operation, which prevents a problem that a plurality of timer control integrated circuits cannot distinguish effective compensation data matrices corresponding to their responsible areas, causing errors in compensation effect of each timer control integrated circuit.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

The implementation, functional characteristics, and advantages of the purpose of the present disclosure will be further described with reference to the embodiments and the drawings.

DETAILED DESCRIPTION OF PREFERRED EMBODIMENTS

It should be understood that the specific embodiments described herein are only used to explain the disclosure, and are not used to limit the disclosure.

As display panels, such as liquid crystal display (LCD) panels and organic light-emitting diode (OLED) display panels, develop toward a direction of lightness, thinness, and large screens, due to uncontrollable factors in actual processes, physical characteristics in each area of the display panels are different, which cause nonuniform brightness in a range greater than a pixel point when displaying a pure grayscale image, that is, a Mura phenomenon called by the industry.

Figure 1:
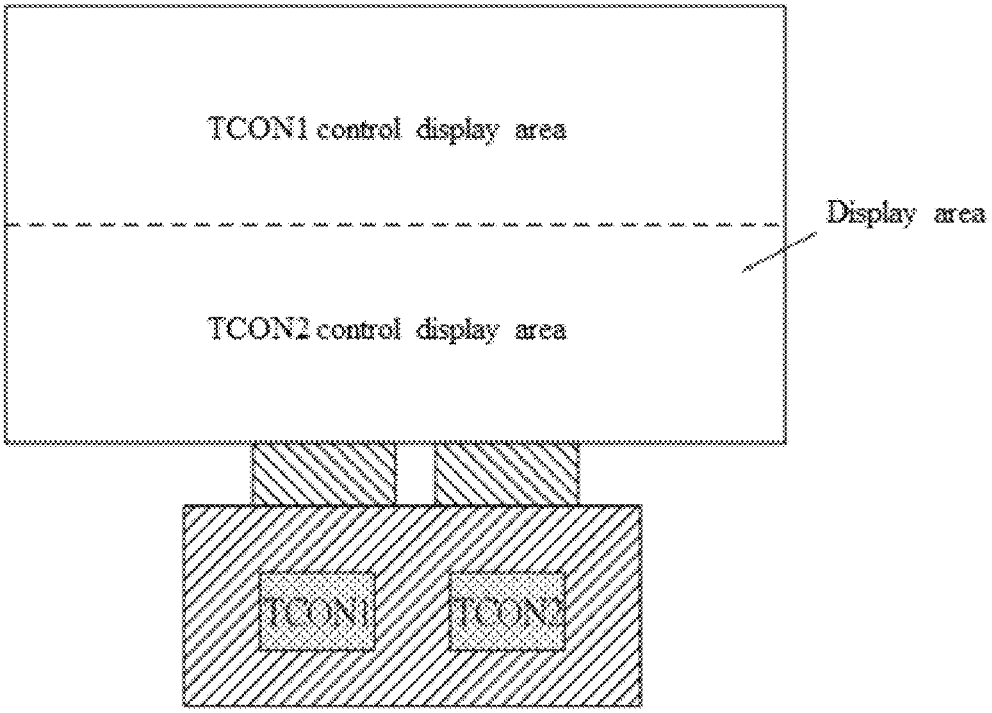
FIG. 1 is a schematic structural diagram of a Mura phenomenon compensation device according to an embodiment of the present disclosure.
Figure 2:
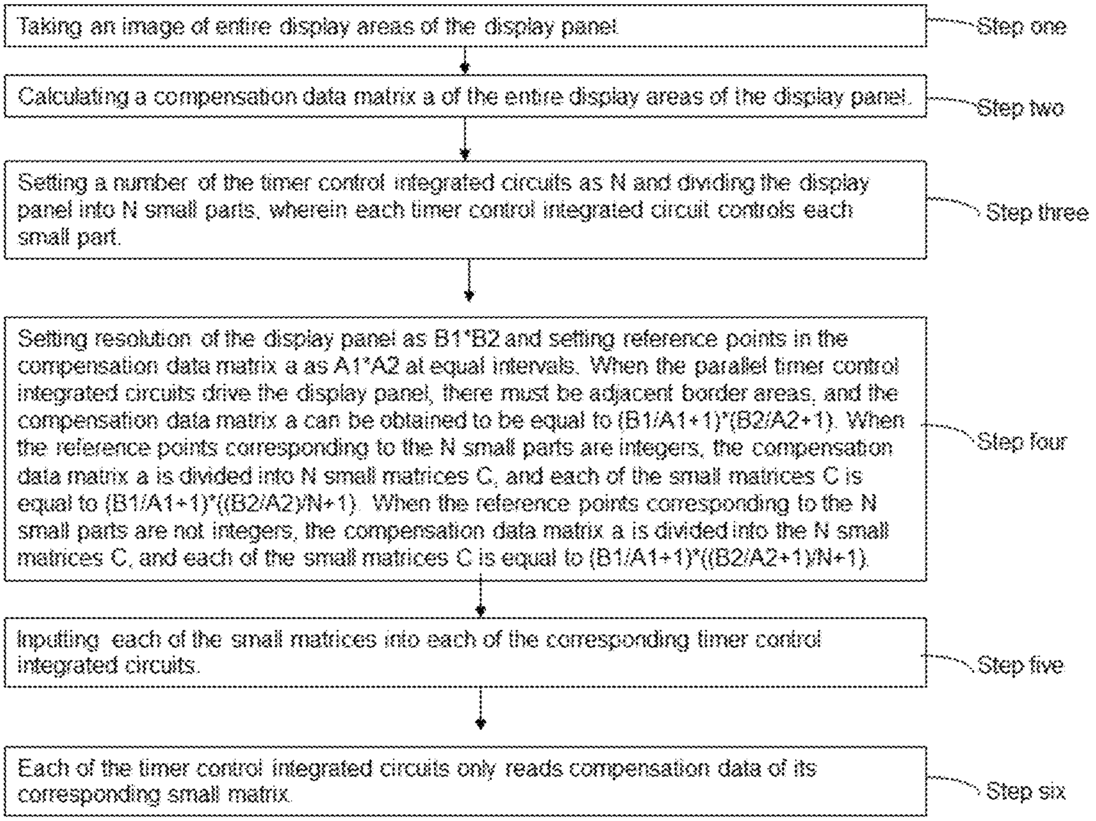
FIG. 2 is a flowchart of a Mura phenomenon compensation method according to a first embodiment of the present disclosure.

As shown in FIGS. 1 and 2, a Mura phenomenon compensation method provided by a first embodiment of the present disclosure is used in a display panel processed by a plurality of parallel timer control integrated circuits (TCON IC). The display panel in the embodiment of the present disclosure is an LCD. The Mura phenomenon compensation method comprises following steps:

step one: taking an image of entire display areas of the display panel. Specifically, the display panel that displays a certain grayscale image is taken a picture by a camera above a center point of the display panel, and brightness data of the display panel is obtained by captured images.

Step two: calculating a compensation data matrix a of the entire display areas of the display panel according to the collected brightness data. Specifically, a Mura phenomenon compensation processing chip is configured to be connected to the timer control integrated circuits and to calculate the compensation data matrix a of the entire display areas of the display panel.

Step three: setting a number of the timer control integrated circuits as N and dividing the display panel into N small parts, wherein each timer control integrated circuit controls each small part. Specifically, compensation data of all areas of the display panel is divided into areas which each of the corresponding timer control integrated circuits is responsible for.

Step four: setting resolution of the display panel as B1*B2 and setting reference points in the compensation data matrix a as A1*A2 at equal intervals. When the parallel timer control integrated circuits drive the display panel, there must be adjacent border areas, and the compensation data matrix a can be obtained to be equal to (B1/A1+1)*(B2/A2+1). When the reference points corresponding to the N small parts are integers, the compensation data matrix a is divided into N small matrices C, and each of the small matrices C is equal to (B1/A1+1)*((B2/A2)/N+1). When the reference points corresponding to the N small parts are not integers, the compensation data matrix a is divided into the N small matrices C, and each of the small matrices C is equal to (B1/A1+1)*((B2/A2+1)/N+1).

Step five: inputting each of the small matrices into each of the corresponding timer control integrated circuits. In the embodiment, each of the timer control integrated circuits is correspondingly connected to one flash memory (also called flash storage), and each of the small matrices C is input into each flash memory respectively. In other embodiments of the present disclosure, the N timer control integrated circuits are together connected to one flash memory, the flash memory is divided into N storage areas, and each of the small matrices C is input into each of the storage areas respectively.

Step six: each of the timer control integrated circuits only reads compensation data of its corresponding small matrix, thereby allowing each of the timer control integrated circuits only to read its corresponding part of the compensation data during operation and making a brightness compensation function of the display panel be able to reach an accurate compensation effect when the timer control integrated circuits work in parallel. Therefore, the method prevents a problem that the plurality of timer control integrated circuits cannot distinguish effective compensation data matrices corresponding to their responsible areas, which cause errors in compensation effect of each timer control integrated circuit.

Figure 3:
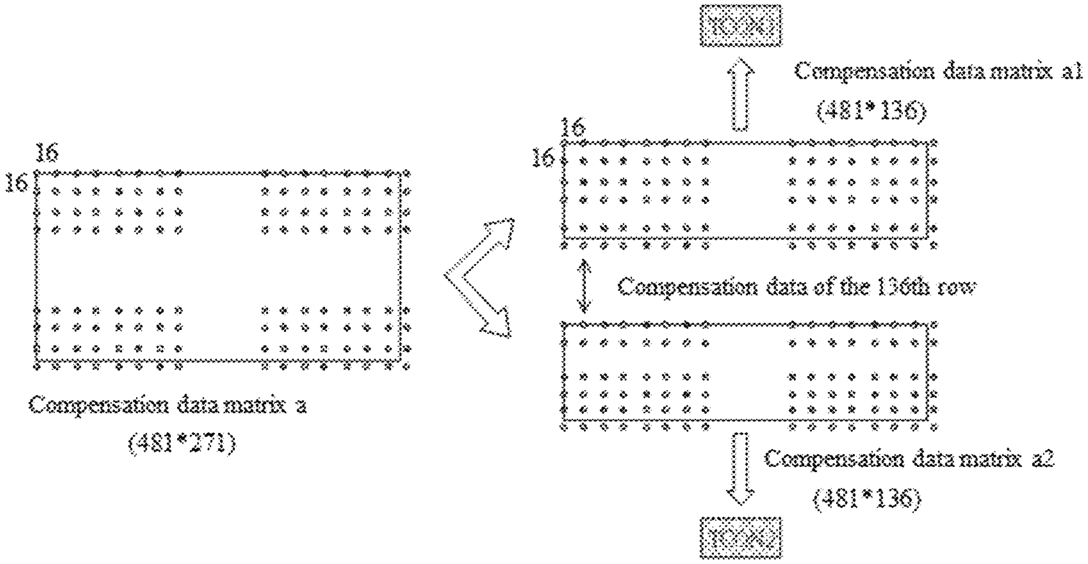
FIG. 3 is a schematic flow diagram of a Mura phenomenon compensation method according to a second embodiment of the present disclosure.

Referring to FIG. 3, the Mura phenomenon compensation method of a second embodiment of the present disclosure sets N of the timer control integrated circuits to be equal to 2, that is, there are a timer control integrated circuit 1 (TCON1) and a timer control integrated circuit 2 (TCON2). The resolution of the display panel is set to be 7680*4320, and reference points set at intervals are 16*16, the compensation data matrix a is 481*271, the reference points corresponding to both of the small parts are integers, and each of the small matrices C is 481*136. When dividing the compensation data matrix a of 481*271 into an upper small matrix and a lower small matrix, the compensation data of a 136th row of the compensation data matrix a is copied.

Specifically, the reference points of the compensation data corresponding to an upper part and a lower part of the display areas in the embodiment are integers. A first row of pixels in the lower part is a position of a reference point of the compensation data, but the compensation data of last few rows of pixels in the upper part needs to use the compensation data of the compensation reference point in the first row of the lower part. At this time, it is necessary to divide the compensation data matrix a of compensation reference points of the entire display panel into the upper part a1 and the lower part a2, which are stored in different flash memories and corresponding to two timer control integrated circuits, that is, TCON1 and TCON2. When TCON1 and TCON2 read the compensation data, they read different flash memories. When the resolution is 7680*4320, the compensation reference points set at intervals are 16*16, and the compensation data matrix a has 481*271 of data, a position of the compensation data of the 136th row of the compensation data matrix a is in the first row of pixels of the lower part of the display areas. However, the compensation data of the last few rows of pixels in the upper part of the display areas needs to be calculated by linear interpolation from the compensation data of a 135th row and the 136th row of the compensation data matrix a, so when dividing the compensation data matrix a, the compensation data of the 136th row needs to be copied. That is, the compensation data of the 136th row of the compensation data matrix a is the compensation data of the 136th row of a small matrix a1 (the upper part), and meanwhile, is also the compensation data of the first row of a small matrix a2 (the lower part). By this way, the small matrix a1 and the small matrix a2 are all 481*136 of data matrices.

Figure 4:
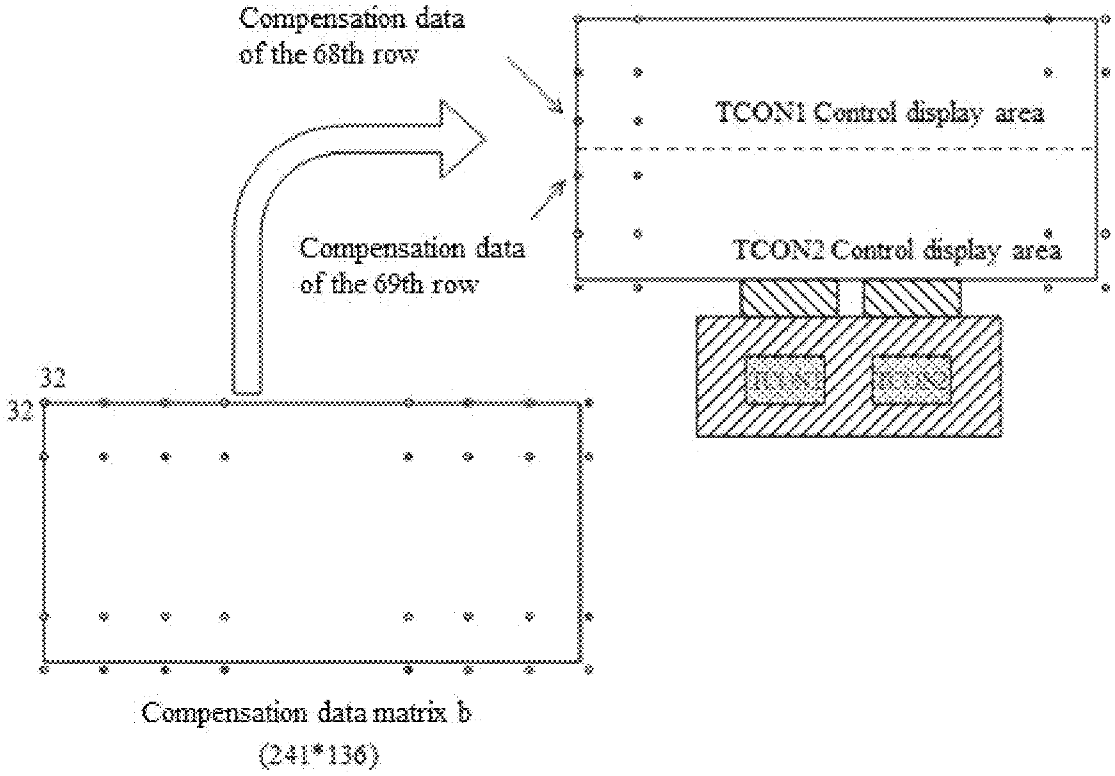
FIG. 4 is a schematic flow diagram of a Mura phenomenon compensation method according to a third embodiment of the present disclosure.
Figure 5:
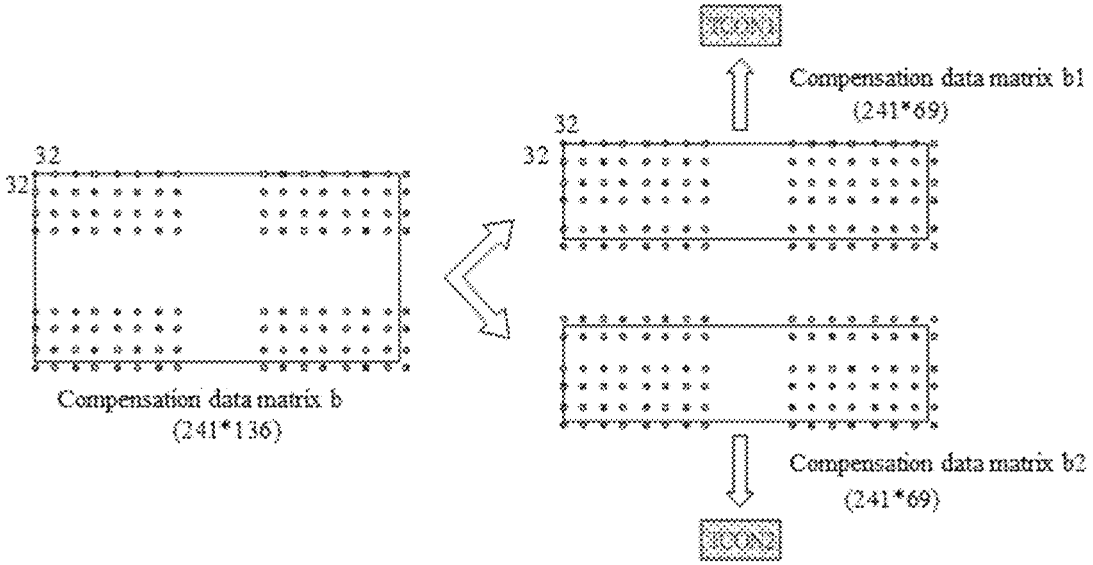
FIG. 5 is another schematic flow diagram of the Mura phenomenon compensation method according to the third embodiment of the present disclosure.

Referring to FIGS. 4 and 5, the Mura phenomenon compensation method of a third embodiment of the present disclosure sets N of the timer control integrated circuits to be equal to 2, that is, there are a timer control integrated circuit 1 (TCON1) and a timer control integrated circuit 2 (TCON2). The resolution of the display panel is set to be 7680*4320, and the reference points set at intervals are 32*32, the compensation data matrix a is 241*136, the reference points corresponding to the display areas of both of the small parts are not integers, and each of the small matrices C is 241*69. When dividing the compensation data matrix a of 241*136 into an upper small matrix and a lower small matrix, the compensation data in a 68th row and a 69th row of the compensation data matrix a is copied.

Specifically, the reference points of the compensation data corresponding to an upper part and a lower part of the display areas are not integers. The resolution is 7680*4320, the compensation reference points set at intervals are 32*32, and the compensation data matrix b has 241*136 of data. A dividing line of the display areas of the upper and lower parts is just right in a middle position of an equal spacing area where the compensation data of a 68th row and a 69th row of the compensation data matrix b are set, so the compensation data of the 69th row is necessary to be put in a small matrix b1 of the upper display area. For the timer control integrated circuit responsible for the upper part of the display areas, when displaying the last 16 rows of pixels in the upper part of the display areas, the compensation data of the 68th row and the 69th row of the compensation data matrix b is used to perform 32*32 of equal interval linear interpolation calculation (pixel data from a 17th row to a 32nd row in the equal intervals are not necessary to be calculated). For the lower part of the display areas, the compensation data of the 68th row of the compensation data matrix b is necessary to be put in a small matrix b2 of the lower display area, and a position of a first row of pixels of the lower part of the display areas is the 17th row of pixels in the equal intervals corresponding to the compensation data of the 68th row and the 69th row. When a timer control integrated circuit corresponding to this area receives grayscale data of original pixels and calculates the compensation data corresponding to pixel positions, it needs to increase row positions of all original pixels by 16, that is, a first row of pixels in the display areas becomes the pixel position of the 17th row in the small matrix b2. By this way, the compensation data obtained by the linear interpolation calculation can accurately correspond to positions of the original pixels.

The present disclosure comprises a Mura phenomenon compensation device which comprises a display panel divided into a plurality of display areas. The Mura phenomenon compensation device comprises: a plurality of timer control integrated circuits, wherein each of the timer control integrated circuits is correspondingly connected to each of the display areas; and a Mura phenomenon compensation processing chip configured to be connected to the timer control integrated circuits, used to calculate a compensation data matrix a of the entire display areas of the display panel, and to divide the compensation data matrix a into a plurality of small matrices, wherein data of each small matrix correspondingly compensates each of the display areas.

In an embodiment of the present disclosure, each of the timer control integrated circuits is correspondingly connected to one flash memory, and the data of each small matrix is input into each flash memory respectively.

In another embodiment of the present disclosure, the plurality of timer control integrated circuits are together connected to one flash memory, the flash memory is divided into N storage areas, and data of each of the small matrices is input into each of the storage areas respectively.

Through each of the timer control integrated circuits only reading compensation data of its corresponding small matrix, the present disclosure allows each of the timer control integrated circuits only to read its corresponding part of the compensation data during operation and makes a Mura compensation function still work normally when a same display panel is driven by the plurality of timer control integrated circuits. Therefore, it can prevent a problem that the plurality of timer control integrated circuits cannot distinguish effective compensation data matrices corresponding to their responsible areas, which cause errors in compensation effect of each timer control integrated circuit.

It should be noted that in the present disclosure, the terms "comprise", "include", or any other variants thereof are intended to cover non-exclusive inclusion, so that a process, a method, an article, or a device that includes a series of elements includes not only those elements, but also includes other elements that are not explicitly listed, or includes elements inherent to this process, method, article, or device. In the absence of more restrictions, the element defined by the sentence "comprise one . . . " does not exclude that there are other identical elements in the process, method, article, or device that includes the element.

The sequence numbers of the above embodiments of the present disclosure are for description only, and do not represent the advantages and disadvantages of the embodiments.

The embodiments of the present disclosure have been described above with reference to the drawings, but the present disclosure is not limited to the above-mentioned specific implementations. The above-mentioned specific implementations are only schematic, not limiting, and many forms without departing from the scope of the purpose and claims of the present disclosure can be made by those of ordinary skilled in the art under the enlightenment of the present disclosure, all of which fall within the protection of the present disclosure.

What is claimed is:

1. A Mura phenomenon compensation method, configured to use a plurality of parallel timer control integrated circuits to process a display panel, wherein the method comprises following steps:

step one: taking an image of entire display areas of the display panel;

step two: calculating a compensation data matrix a of the entire display areas of the display panel;

step three: setting a number of the timer control integrated circuits as N and dividing the display panel into N small parts, wherein each timer control integrated circuit controls each small part;

step four: setting resolution of the display panel as B1*B2 and setting reference points in the compensation data matrix a as A1*A2 at equal intervals, wherein the compensation data matrix a is equal to (B1/A1+1)*(B2/A2+1);

when the reference points corresponding to the N small parts are integers, the compensation data matrix a is divided into N small matrices C, and each of the small matrices C is equal to (B1/A1+1)*((B2/A2)/N+1); and when the reference points corresponding to the N small parts are not integers, the compensation data matrix a is divided into the N small matrices C, and each of the small matrices C is equal to (B1/A1+1)*((B2/A2+1)/N+1);

step five: inputting each of the small matrices into each of the corresponding timer control integrated circuits; and step six: each of the timer control integrated circuits only reads compensation data of its corresponding small matrix.

2. The Mura phenomenon compensation method according to claim 1, wherein each of the timer control integrated circuits is correspondingly connected to one flash memory, and each of the small matrices C is input into each flash memory respectively.

3. The Mura phenomenon compensation method according to claim 1, wherein the N timer control integrated circuits are together connected to one flash memory, the flash memory is divided into N storage areas, and each of the small matrices C is input into each of the storage areas respectively.

4. The Mura phenomenon compensation method according to claim 1, wherein when N is 2, the resolution of the display panel is set to be 7680*4320, and the reference points set at intervals are 16*16, the compensation data matrix a is 481*271, the reference points corresponding to both of the small parts are integers, and each of the small matrices C is 481*136.

5. The Mura phenomenon compensation method according to claim 4, wherein when dividing the compensation data matrix a of 481*271 into an upper small matrix and a lower small matrix, the compensation data in a 136th row of the compensation data matrix a is copied.

6. The Mura phenomenon compensation method according to claim 1, wherein when N is 2, the resolution of the display panel is set to be 7680*4320, and the reference points set at intervals are 32*32, the compensation data matrix a is 241*136, the reference points corresponding to the display areas of both of the small parts are not integers, and each of the small matrices C is 241*69.

7. The Mura phenomenon compensation method according to claim 6, wherein when dividing the compensation data matrix a of 241*136 into an upper small matrix and a lower small matrix, the compensation data in a 68th row and a 69th row of the compensation data matrix a is copied.

8. A Mura phenomenon compensation device, comprising:

a display panel divided into a plurality of display areas;

a plurality of timer control integrated circuits, wherein each of the timer control integrated circuits is correspondingly connected to each of the display areas; and a Mura phenomenon compensation processing chip configured to be connected to the timer control integrated circuits, used to calculate a compensation data matrix a of the entire display areas of the display panel, and to divide the compensation data matrix a into a plurality of small matrices, wherein data of each small matrix correspondingly compensates each of the display areas.

9. The Mura phenomenon compensation device according to claim 8, wherein each of the timer control integrated circuits is correspondingly connected to one flash memory, and the data of each small matrix is input into each flash memory respectively.

10. The Mura phenomenon compensation device according to claim 8, wherein the timer control integrated circuits are together connected to one flash memory, the flash memory is divided into N storage areas, and the data of each small matrix is input into each of the storage areas respectively.

* * * * *